US011889023B2

(12) United States Patent
Dahan et al.

(10) Patent No.: US 11,889,023 B2
(45) Date of Patent: Jan. 30, 2024

(54) SYSTEM AND METHOD FOR OMNICHANNEL USER ENGAGEMENT AND RESPONSE

(71) Applicant: FonCloud, Inc., Toronto (CA)

(72) Inventors: Jean-David Dahan, Cedar Park, TX (US); Shai Berger, Toronto (CA); Michael Pultz, Toronto (CA); Jason Bigue, Toronto (CA)

(73) Assignee: Fancloud, Inc., Toronto (CA)

( * ) Notice: Subject to any disclaimer, the term of this patent is extended or adjusted under 35 U.S.C. 154(b) by 119 days.

(21) Appl. No.: 17/699,047

(22) Filed: Mar. 18, 2022

(65) Prior Publication Data

US 2022/0210274 A1 Jun. 30, 2022

Related U.S. Application Data

(63) Continuation of application No. 17/125,179, filed on Dec. 17, 2020, now Pat. No. 11,283,926, which is a
(Continued)

(51) Int. Cl.
*H04M 3/51* (2006.01)
*G06F 16/332* (2019.01)
(Continued)

(52) U.S. Cl.
CPC ...... *H04M 3/5166* (2013.01); *G06F 16/3329* (2019.01); *G06F 16/951* (2019.01); *G10L 15/26* (2013.01); *G10L 25/51* (2013.01); *H04M 3/4931* (2013.01); *H04M 3/4938* (2013.01); *H04M 3/5231* (2013.01); *H04M 3/568* (2013.01); *H04M 7/0045* (2013.01);
(Continued)

(58) Field of Classification Search
CPC .. H04M 3/5166; H04M 3/4931; H04M 3/568; H04M 3/4938; G06F 17/30864; G10L 25/51; G10L 15/26
USPC ............... 379/88.18, 188, 88.17, 242, 88.01, 379/265.02, 88.03, 283, 88.04; 709/224; 348/14.06
See application file for complete search history.

(56) References Cited

U.S. PATENT DOCUMENTS

| | | | |
|---|---|---|---|
| 9,762,733 B1* | 9/2017 | Ramanujaiaha | H04M 3/42068 |
| 2017/0098282 A1* | 4/2017 | Klemm | G06Q 50/01 |
| 2018/0084111 A1* | 3/2018 | Pirat | H04L 51/04 |

* cited by examiner

*Primary Examiner* — Thjuan K Addy
(74) *Attorney, Agent, or Firm* — Law Office of John Stattler

(57) ABSTRACT

A telephone subnet crawler is used to access automated telephone response systems and index the information, contents and structure contained therein. A database of the information, contents and structure of a plurality of automated telephone response systems is created by the telephone subnet crawler. A user interface provides a waiting party with direct access to the information, contents and structure of the automated telephone response systems contained in the database. Where an automated telephone response system requires user input, the user interface calls the automated telephone response system and navigates to the node requiring user input, provides the user input and displays the results to the user. Where an automated telephone response system connects to an operator, the user interface calls the automated telephone response system, navigates to the node for an operator, and when an operator is detected, calls the user at a user provided callback number.

20 Claims, 14 Drawing Sheets

Related U.S. Application Data continuation of application No. 16/571,183, filed on Sep. 15, 2019, now Pat. No. 10,904,384, which is a continuation of application No. 15/786,212, filed on Oct. 17, 2017, now Pat. No. 10,419,610.

(51) Int. Cl.
*G10L 13/00* (2006.01)
*H04M 3/56* (2006.01)
*H04M 3/493* (2006.01)
*G10L 15/26* (2006.01)
*G10L 25/51* (2013.01)
*G06F 16/951* (2019.01)
*H04M 3/523* (2006.01)
*H04M 7/00* (2006.01)
*H04M 11/10* (2006.01)

(52) U.S. Cl.
CPC .............. *G10L 13/00* (2013.01); *H04M 11/10* (2013.01); *H04M 2203/652* (2013.01)

SYSTEM AND METHOD FOR OMNICHANNEL USER ENGAGEMENT AND RESPONSE

CROSS-REFERENCE TO RELATED APPLICATIONS

This application is a continuation of application Ser. No. 17/125,179 having a filing date of Dec. 17, 2020, which is a continuation application of Ser. No. 16/571,183 (now U.S. Pat. No. 10,904,384) having a filing date of Sep. 15, 2019, which is a continuation of application Ser. No. 15/786,212 (now U.S. Pat. No. 10,419,610) having a filing date of Oct. 17, 2017.

FIELD OF INVENTION

The present embodiments generally relate to an omnichannel system to fulfill a user request.

BACKGROUND

Many companies with products and service offer an automated telephone response system or a website or both.

A user doing business or intending to do so with the company, could visit the website, potentially create a profile in a secure location and go about doing business. A website could have an internet version and a mobile version tailored to be viewed on a smaller form factor mobile device. In the meantime, to extract the best service and ensure seamless experience, many companies offer thin client user mobile applications or apps residing on the mobile device.

A user could do business either in person (e.g. in a bank), via the Internet, via a mobile app, or via a voice or telephone call.

In the case of a phone channel, an automated telephone response system is a telephone based communication technology that provides a waiting party with services based upon a waiting party's responses to various prompts. A product or service provider, a queuing party, will typically publish a telephone number and connect the telephone line to a computer system that detects voice and touch tones from an incoming telephone call. The queuing party then creates a series of messages that are accessed by the waiting party. The messages typically give menu choices or information that the waiting party can choose from by either voice response or touching a number on their telephone. Such automated telephone response systems include Interactive Voice Response (IVR) systems, Automatic Call Distributors (ACD), Private Branch Exchanges (PBX), and Voice Over IP (VoIP) systems, to name a few.

An information system like an automated telephone response system or a website or mobile app can also provide more complex services and give dynamically created messages. There are static and dynamic contents. While, for instance, a financial institution, may have a code for displaying or a script or a pre-recorded messages for speaking their mailing address, or for local branch locations, they will also provide services such as account balance information, payment due date, or the ability to make a payment over the telephone or via a web browser or a mobile application. When a user wishes to know their account balance, the automated telephone response system or the website may enquire about the account number or user login information, the user name or other identifying information such as a customer PIN number or other authentication factors such as answer to predetermined questions.

One disadvantage of service centers is that different options for a user to get to a desired end are often siloed and don't talk to each other. For example, a customer trying do an online transaction on a website might need to talk to a representative briefly to resolve an issue which is not part of the menu. Moreover, upon switching to that representative the user has to start the whole transaction over (i.e. the context is not maintained).

Other examples may involve a customer who would like to hang up the phone and continue a transaction on a computer or mobile device. Yet other examples might be handing a call from one device, say a landline phone, to another device, like a mobile phone, or switching to a larger form factor for more clarity and functionality.

From the foregoing, it will be apparent that there remains a need to improve the user experience with siloed systems or an integrated information delivery system, so that the context of any transaction is maintained while switching between those systems.

SUMMARY

Embodiments are presented by way of example and include the following:

One embodiment presents an omnichannel system comprising: an interface configured to receive a request from a user; a web crawler in communication with the interface and configured to fulfill the request by navigating the web; a telephone subnet crawler in communication with the interface and configured to fulfill the request by navigating an automated telephone response system.

One embodiment presents an omnichannel system comprising a local interface in communication with a cloud based speech-to-text module and text-to-speech module in a first cloud platform in communication with the local interface, a cloud based natural language processing module in a second cloud platform in communication with the first cloud platform.

One embodiment presents an omnichannel system comprising a chatbot, the chatbot comprising a user interface configured to obtain a user input, a natural language processing (NLP) module configured to obtain the user input and generate a request category, a request indexed database configured to obtain the request category and identify a specific request type, an answer database configured to obtain the specific request and provide an answer to the specific request type and send the answer to the user interface.

One embodiment presents a method for fulfilling a user request, the method comprising: receiving the user request through a phone channel; transferring the user request to a chat channel configured to fulfill the user request; continuing to navigation on the phone channel to fulfill the user request in parallel.

In one embodiment a chatbot engages in a conversation with a user who has a request, the chatbot attempts to ask for relevant data from the user, a natural language processing unit then extracts certain attached data or session data from the chat conversation. A decision engine identifies one or more actions to be performed accordingly. A web crawler then navigates a website using the attached data or session data and attempts to perform one or more functions according to the user request. The web crawler then confirms if the request was fulfilled successfully. Upon the confirmation the chatbot informs the user through a message. If the request is not fulfilled, the web crawler passes the attached data or session data to a telephone subnet crawler which navigates a telephone response system to reach a node most relevant to the user's request.

In one embodiment, a system comprises a database comprising a number of active accounts of a user, an interface for displaying user activities, a web crawler for performing an action on behalf of the user. The system may further comprise a telephone subnet crawler for performing an action on behalf of a user wherein the telephone subnet crawler may be configured to use data from the database, the interface, and the web crawler to navigate a telephone response system to perform an action.

In one embodiment a system comprises a chatbot, a database comprising metadata, a natural language processing module, and an interface. The chatbot engages in a conversation with a user and a status of an account is presented to the user via the interface only including the metadata. Further the system is configured to receive a request from the user and perform one or more functions on behalf of the user.

In one embodiment, a system comprises a chatbot comprising a main interface and a plurality of secondary interfaces, each secondary interface configured to access at least one dedicated cloud based database residing in a dedicated cloud platform, thereby allowing a user to select a secondary interface and fulfill a user request through accessing one dedicated cloud based database.

In one embodiment, a system comprises a chatbot comprising an interface, a natural language processing module, and a knowledge base repository, wherein the knowledge database is based in part on knowledge obtained from a telephone subnet crawler.

In one embodiment a computerized method comprises engaging a user in a conversation with a chatbot, using natural language processing to identify a relevant request, using a response generator to provide answers to users request from a knowledge base, and identifying an incomplete knowledge area, and using a telephone subnet crawler to navigate a telephone response system to obtain information to alter the incomplete knowledge area.

In one embodiment, a system comprises a chatbot having a response repository, the response repository containing a plurality of responses to potential questions from a user, an analysis engine to monitor and assign a score to each response based on how well the response helps fulfill the user request, a correction module to check for a low-score response and edit the response repository accordingly.

In certain embodiments, the correction module edits the response repository at least partially based on information gathered by a telephone subnet crawler.

In one embodiment a system comprises a telephone subnet crawler and a natural language processing module. The telephone subnet crawler uses a combination of DTMF tones and/or synthesized or recorded speech, and/or software commands to navigate a telephone response system. A speech to text module is configured to translate the spoken menu of the telephone response system into text and a natural language processing model is used to interpret the text. Accordingly the system reproduces an IVR menu of the automated telephone response system.

One embodiment presents a network system for operating a chatbot comprising an interface client residing on a user's device, a local server in geographical proximity of the user's device, the local server configured to serve at least one of a speech-to-text module, a text-to-speech module, and a static knowledge base, a remote server in network communication with the local server, the remote server configured to update the static knowledge base and the remote server hosting a dynamic knowledge base.

In one embodiment an omnichannel engagement system comprises a chatbot, a web crawler, and a telephone subnet crawler. As the chatbot engages a user and receives a request, the web crawler attempts to fulfill the request at each step the chatbot reports back the progress made by the telephone subnet crawler to navigate to an automated telephone response menu and the chatbot obtains user data needed for the telephone subnet crawler to fulfill the transaction.

In one embodiment a method comprises receiving a call from a user and when the user is put on hold, offering the user to interact via chat channel which would include either or both human chat and automated chat. If the user opts to interact via chat, and is on a mobile phone, then an SMS or other type of messaging is sent to initiate the chat interaction. The interaction can then happen via SMS or other type of message protocols.

Alternatively the initial SMS or messaging point to a URL that, when clicked, will take the caller to a web-based chat interface, or a 3rd party chat platform like Facebook Messenger. The user could also open an already installed chat application like Facebook Messenger or Whatsapp Messenger and continue the transaction through those chat channel. Otherwise the user could alternatively be prompted to install a specific chat application for this purpose.

The system keeps the user's initial call position in the call queue when the messaging session is in progress and thereby has two processes continuing in parallel while the user is on hold for an agent via virtual queuing and may also be interacting with the chat agent or chatbot. If the user request is resolved via chat first, the system opts for dropping the user's spot in the virtual call queue. If the user's turn to speak to an agent arrives first, the chatbot notifies the user and optionally abandons the chat. If the chat is unable to fulfill the user request, the system opts for abandoning the chat and maintaining the user's spot on the virtual call queue.

In some embodiments the system is further configured to capture and carry over any information gathered in the call (session information) prior to switching to chat, onto the chat session, so the user doesn't have to provide any information twice. And, conversely, the system is configured to capture and carry over any session information gathered during the chat to the live (voice) agent when one is reached on the phone. The session information could be carried over through session initiation protocol (SIP) headers, passed via web services, or stored in a query database, or key-value pair stores, or other methods.

One embodiment presents a system for allowing a user to access a human operator (or live agent) in an automated telephone system having a plurality of subnets, wherein different subnets may have different designated human operators. The system may include an interface configured for requesting information from a user; a search module, connected to the interface, configured to receive the information, and to query a database for a subnet within the automated telephone system based on the information request; a telephone subnet crawler connected to the search module and configured to navigate the subnet to reach a human operator pertinent to that subnet in the automated telephone system; and a telephone module linked to the telephone subnet crawler and configured to initiate a call to the user (a callback) and then connect that call to the live voice agent.

One embodiment presents a system for allowing a user to access information in an automated telephone system having a plurality of nodes which may comprise an interface configured to receive a search term or terms from a user to search for information from an automated telephone system; a search module connected to the interface and configured to translate the search term into a desired node in the automated telephone system; and a telephone subnet crawler connected to the search module and the interface, and configured to navigate to the desired node, wherein the interface is further configured to offer the user an option of fetching the information for the user or initiating a telephone call between the user and the desired node.

In one embodiment a user chats with a chatbot on a device and, in the meantime, is presented a representation of an automated telephone response system where the user could choose a node of the system at any time during the chat with the chatbot. A telephone subnet crawler is configured to navigate to the desired node indicated by the user. The system is configured to allow the user to switch between chatting with the chatbot and reaching a live agent, or to fetch desired information by querying a database at any time.

In one embodiment a web crawler is launched to obtain web information about an automated telephone response system, the web information is used as partial input of a telephone subnet crawler to navigate through a telephone response system and reach a particular subnet node. Alternatively the telephone subnet crawler is used to extract information from the subnet node and provide it as text or synthesized speech to a user.

In one embodiment, the interaction of the user with a chatbot is analyzed by running analytics through natural language processing. Based on the analysis, a particular node of a telephone response system is identified as the most likely node that pertains to a potential user request. A telephone subnet crawler is then used to navigate the telephone response system to reach that particular node. Whenever needed, a telephone module is used to initiate a call between the user and that particular node to either talk to a human operator or to obtain proper information.

In one embodiment, a system consists of an indexed telephone subnet data repository, a telephone subnet crawler, and a chatbot. The chatbot extracts information from a user using natural language processing and a query engine to query the data repository for telephone subnet nodes corresponding to information extracted using natural language processing. The telephone subnet crawler then navigates a related automated telephone response system accordingly to reach the node. The result of the transaction is then fed back into a learning module.

BRIEF DESCRIPTION OF DRAWINGS

Embodiments are described by way of example with reference to the accompanying drawings in which:

FIG. 1-B is a diagram illustrating the structure of an omnichannel response system according to one embodiment.

FIG. 1-C is a diagram illustrating the structure of an omnichannel response system according to one embodiment.

FIG. 1-D is a diagram illustrating the structure of an omnichannel response system according to one embodiment.

FIG. 1-E is a diagram illustrating the state management of an omnichannel response system according to one embodiment.

FIG. 3-B is a diagram illustrating the cloud implementation of an omnichannel system according to one embodiment.

FIG. 3-C is a diagram illustrating the cloud implementation of an omnichannel system according to one embodiment.

DETAILED DESCRIPTION OF EMBODIMENTS

In the following detailed description, reference is made to the accompanying drawings that show, by way of illustration, specific exemplary embodiments. These embodiments are described in sufficient detail to enable those skilled in the art to practice the embodiments. It is to be understood that the various embodiments, although different, are not necessarily mutually exclusive. For example, a particular feature, structure, or characteristic described herein in connection with one embodiment may be implemented within other embodiments without departing from the spirit and scope of the embodiments. In addition, it is to be understood that the location or arrangement of individual elements within each disclosed embodiment may be modified without departing from the spirit and scope of the embodiments. The following detailed description is, therefore, not to be taken in a limiting sense, and the scopes of the present embodiments are defined only by the claims, appropriately interpreted, along with the full range of equivalents to which the claims are entitled.

The present disclosure relates to an interactive integrated omnichannel response system from the perspective of a user and provides embodiments for implementing a quicker, easier and more satisfying experience without placing any additional burden on the businesses or services that employ such integrated omnichannel response systems.

Figure 1A:
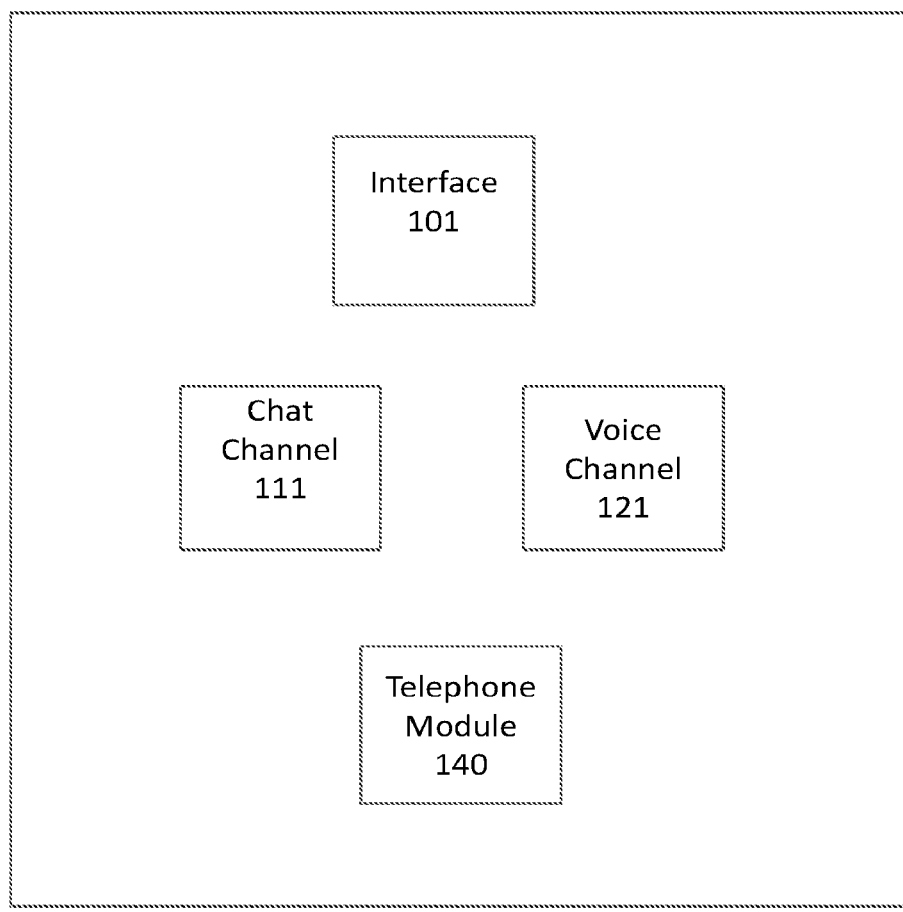
FIG. 1-A is a diagram illustrating the structure of an omnichannel response system according to one embodiment.

FIG. 1A is a graphical representation of an omnichannel system according to the present embodiments. The system comprises interface 101, chat channel 111, voice channel 121, and telephone module 140. In operation, interface 101 serves as an interface to engage a user with a request. Interface 101 could utilize either chat channel 111 or voice channel 121 to fulfill the user's request. Chat channel 111 uses information provided to the interface by the user or information already in the system about the user or the nature of the user's request to resolve the issue and fulfill the user's request. If chat channel 111 is not successful or if voice channel 121 is deemed more likely to fulfill the request, voice channel 121 secures a virtual spot in the queue or navigates a telephone response system until it gets to an appropriate node which can address the issue and the user's request. Once the virtual spot reaches the front of the queue or once the node is reached, or about to be reached by the telephone subnet crawler, telephone module 140 initiates a callback to the user. When the user answers, she is connected to a live voice agent (in the first case) or an automated telephone response system (in the second case).

The node in the automated telephone response, which the omnichannel system might need to reach to resolve the user request, might be attended by a live human agent. In this case the user eventually gets to talk to that (voice) agent.

Figure 1B:
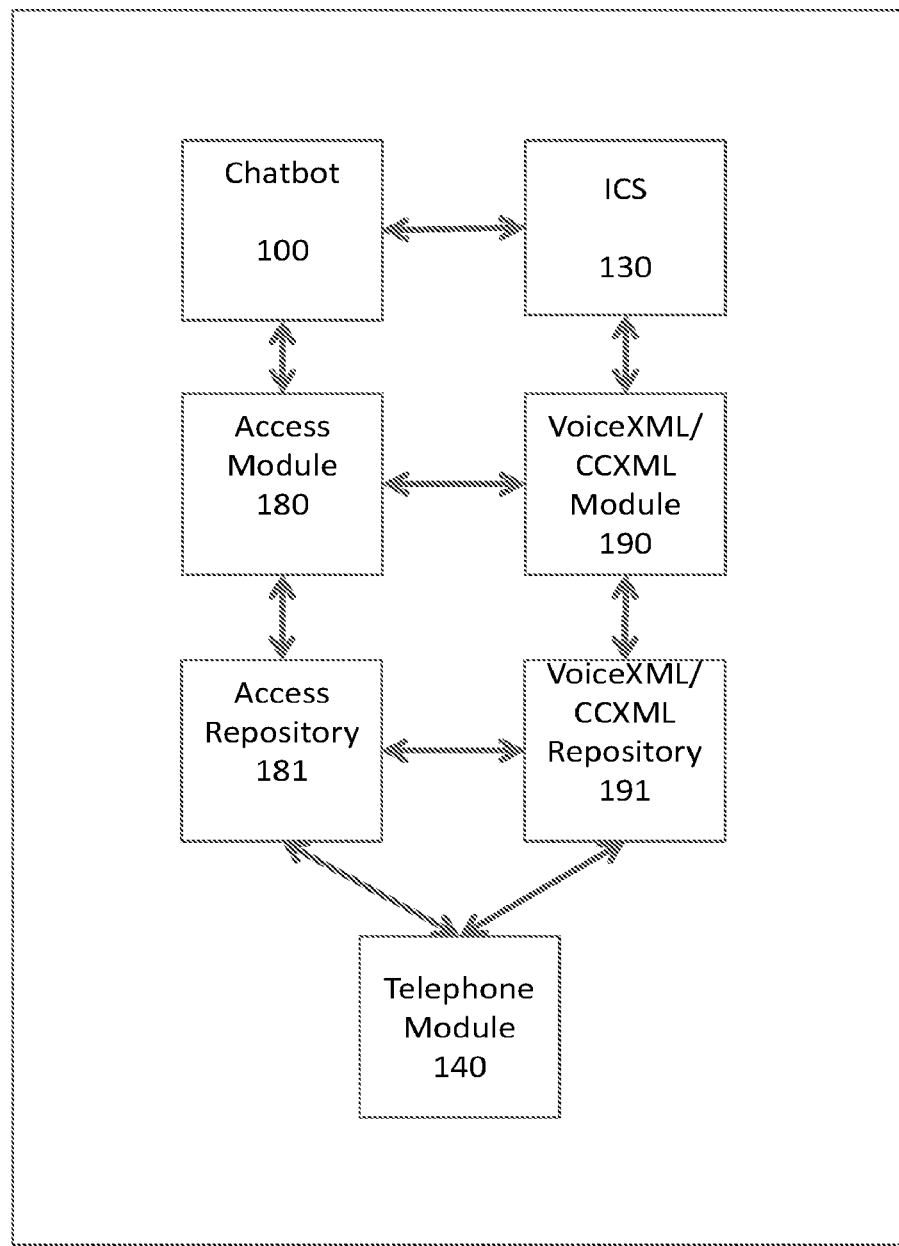

FIG. 1B is an illustration of an omnichannel system in accordance with some embodiments. This system includes chatbot 100 and independent communication system (ICS) 130. A user might initially engage with either of these two components. In either case the user could be given the option of switching from the chatbot mode to ICS mode or vice versa.

The omnichannel of FIG. 1B shows the structure of the two communication channels in more detail. Below chatbot 100 there is access module 180 which is used to access third party information. The access might include accessing databases and changing some data in these databases. The databases might be proprietary to third parties. However, these third parties provide facilities to the chat channel of the chatbot. To this end, the omnichannel system also includes access repository 181 which is a compilation of the third party facilities and knowledge of how it could access the third party databases.

On the voice channel, under ICS 130, there is VoiceXML/CCXML module 190. VoiceXML and CCXML are industry standard protocols for setting up IVRs and other voice-based interactive systems. Some companies or called parties use VoiceXML/CCXML to set up their IVR menu. Accordingly, the ICS can use those protocols to navigate the voice menu or perform other actions. VoiceXML/CCXML module 190 navigates the IVR menu using VoiceXML/CCXML and reaches a desired node. Another module seen in FIG. 1B is VoiceXML/CCXML module 191 which has a compilation of called parties which use these protocols.

Figure 1C:
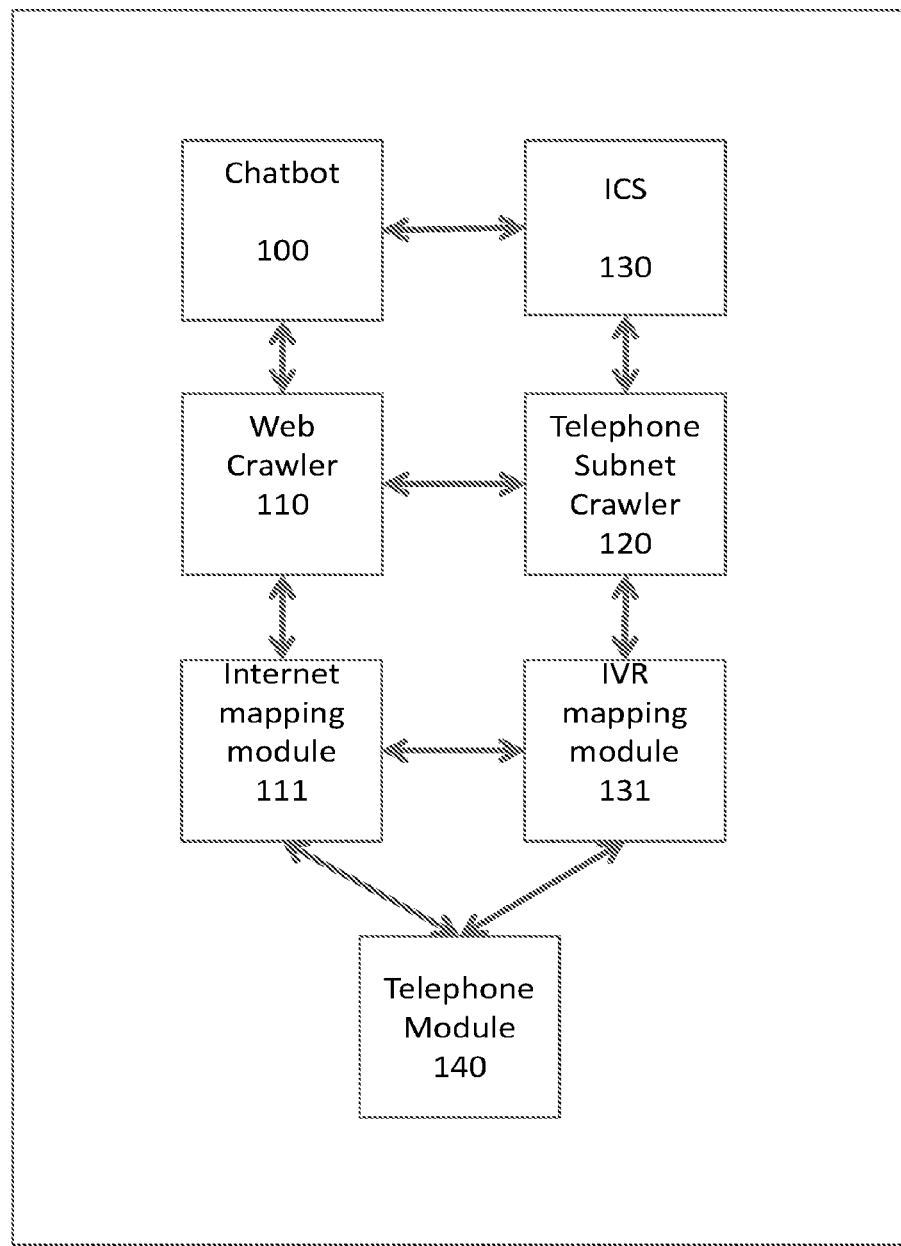

Referring now to FIG. 1C, there is another embodiment where there are two components, namely, internet mapping system 111 and IVR mapping module 121 that relate to this embodiment. During system idle times or off peak hours, web crawler 110 navigates websites of interest, and in particular, websites of interest in view of potential or recent user requests, and tries to investigate how to potentially resolve an anticipated user request based on the mapping.

Likewise, telephone subnet crawler 120 uses idle times or off-peak hours to navigate and map IVR menus of telephone response systems, and in particular, those of potential interest or recent interest to users and tries to investigate how to potentially resolve an anticipated user request based on the mapping. The system occasionally checks to discover if the off-peak IVR is different from the business hours IVR and navigates both IVR menus. When fulfilling a request, the telephone subnet crawler is aware of the differences in the two IVR menus of business hours and off-peak hours and navigates accordingly.

Referring now to the embodiments shown in FIG. 1C, internet mapping module 111 generates a database of web pages and websites in relation with potential user requests. Every time a user request is resolved, this module analyses the information about how it was resolved and what web pages and websites were used and in what order and using what data. Any user data or confidential data is encrypted at rest in internet mapping module 111 and web index 112.

Likewise, IVR mapping module 131 generates a database of telephone response systems and associated or likely user requests that could be resolved by reaching specific nodes in those telephone response system and indexes the information in telephone subnet index 132.

Internet mapping module 111 and IVR mapping module 131 could be at the backend of the system or cloud modules and are queried by the frontend modules. Likewise, web index 112 and telephone subnet index 132 could be at the backend of a system or even cloud modules and could be in different cloud platforms.

Figure 1D:
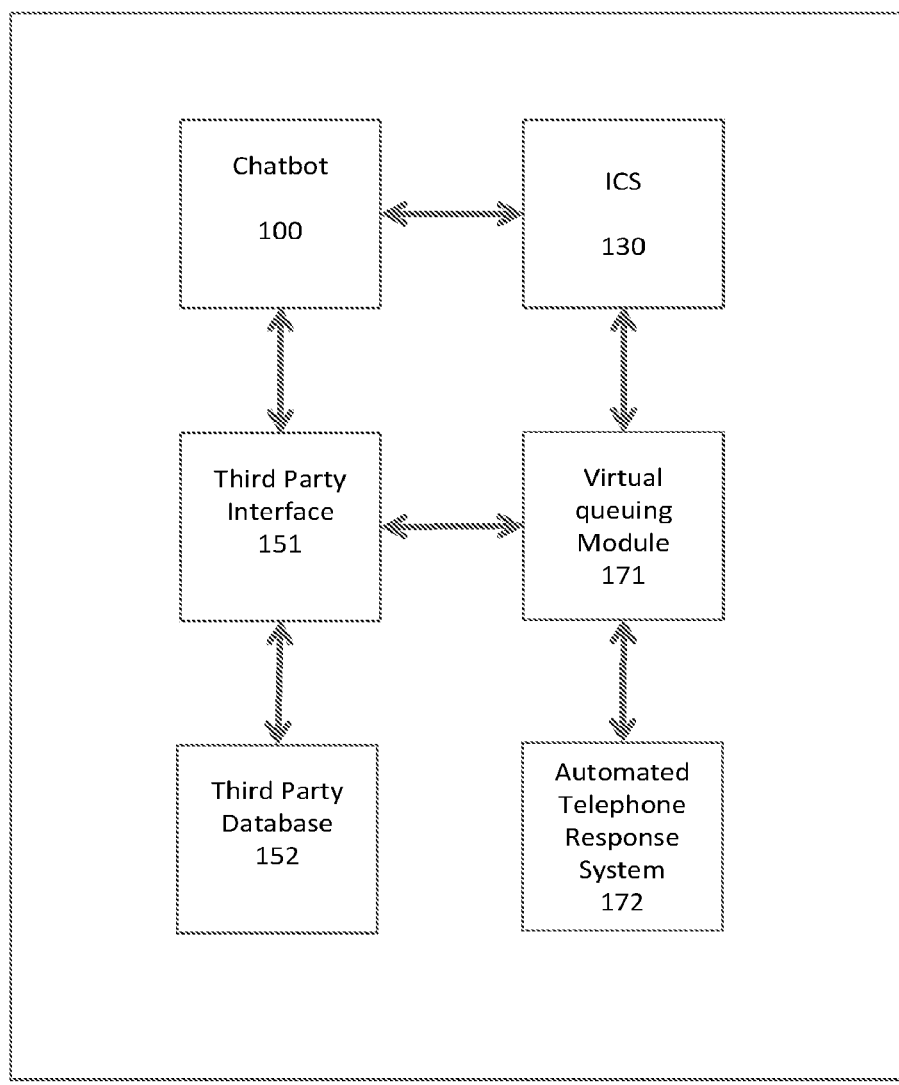

FIG. 1D is an illustration of an omnichannel system with additional components according to some embodiments. At the top level, there is chatbot 100 and ICS 130. A user could use any connected device to interact with the interface of either component through voice, voice chat, voice commands, text, or a phone call. ICS 130 has a graphical interface that could be used from any device. Initially a user could access the system with this graphical interface or could access the chatbot interface. Once a request is received from a user through either channel, it is communicated to the other channel and the two channel exchange data. Alternatively, there could be a common interface that receives text, query, voice command, or voice call and then the common interface engages either or both channels to fulfill a request accordingly.

In the embodiment shown in FIG. 1D, under chatbot 100 there is third party interface 151. This module provides a number of interfaces which are at least partially provided by third party partner of the chatbot platform. A user could make a transaction by going through these interfaces which might pertain to an airline, a bank, a grocery store, etc.

The omnichannel system, in these embodiments, these third party interfaces and modules and when a user has a request she could go through the desired interface. The used interface has direct access to third party database 152 through which the user could fulfill her requests like changing a flight, doing an account transaction, ordering items, etc.

Under ICS 130 in the voice channel, in these embodiments, lies virtual queuing module 171 which maintains a spot in automated telephone response system 172. As explained, both these channels could be active.

In some embodiments, as shown in FIGS. 1B-1D, the chat channel and the voice channel are in communication. In particular, chatbot 100 and ICS 130 are in communication. When either of the two units receives a request through a common or separate interface from a user, they communicate to each other in order to verify which module is best suited to resolve the user request. This could be done by calculating a probability of resolution of the request through either channel based on past or similar user interactions in part. In addition, in some embodiments, the two systems could act simultaneously or cooperate to resolve the user's request as will be explained.

Moreover, at each stage of processing the user request, different components of each subsystem could communicate to each other. For instance, once the request starts being processed, web crawler 110 and telephone subnet crawler 120 could communicate with each other to decide which one is more suitable to fetch certain data related to the user request.

In some embodiments, the communication between the different components includes exchanging user data that was provided to either chatbot 100 and ICS 130. These data could include any user verification, authentication data, account numbers, PINs, etc.

In some embodiments, the communication about the state of the transaction between different components and channels of the omnichannel system is done using SCXML.

SCXML is "State Chart XML"- and presents a way of laying out a generic state machine execution including steps/tasks in XML. The file can then be read by any module that knows how to read SCXML in order to understand and process certain steps.

This is used by systems and services in order to coordinate two or more services or sub-systems that are being delivered over different media or channels. For example, there could be a visual dialog via the internet, and a voice dialog via the PSTN. A user might use both channels for clarity or might switch from one channel to the other for convenience or ease or clarification. It is therefore very important to synchronize the state of the transaction between different channels.

Figure 1E:
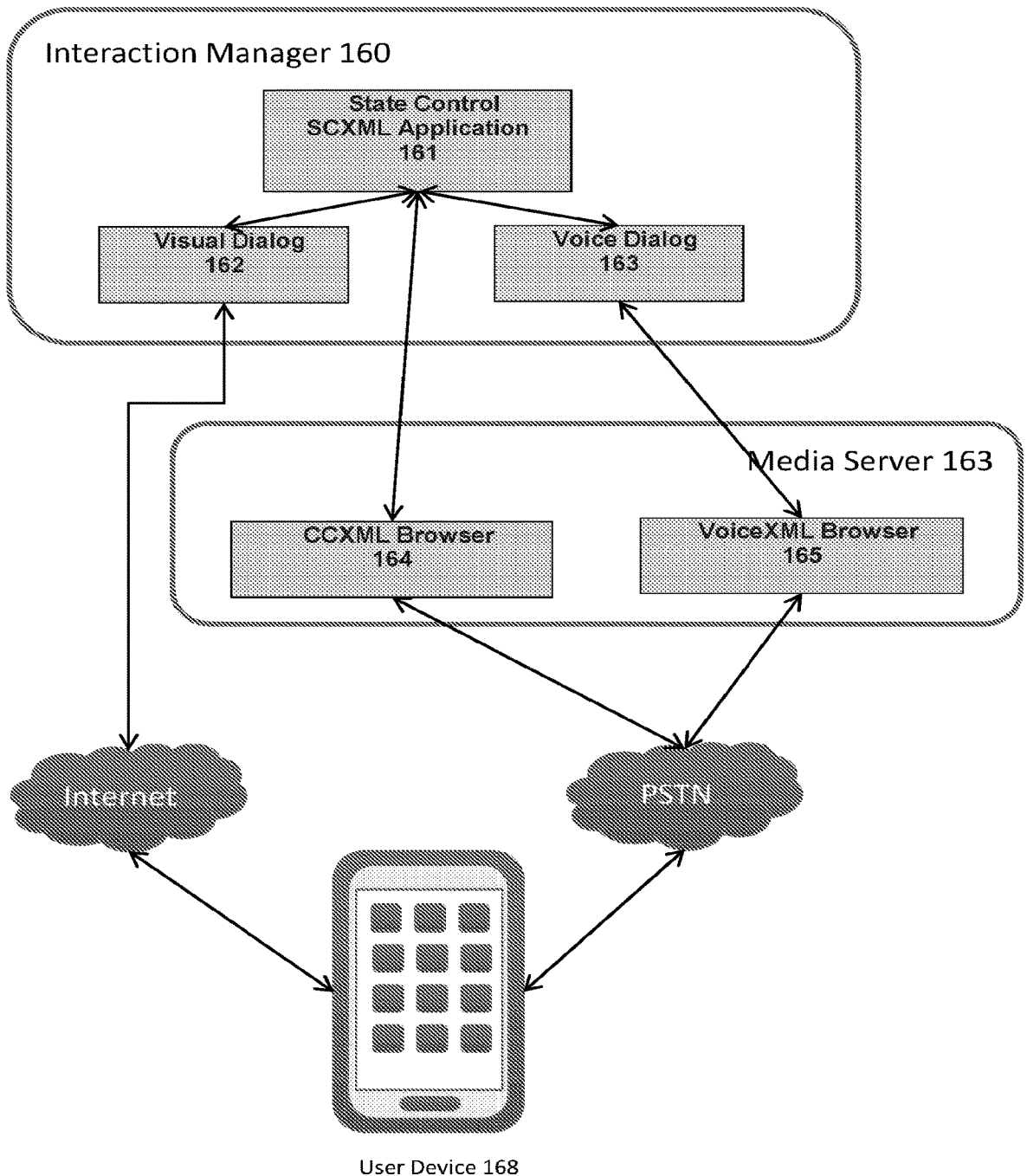

One exemplary embodiment of an SCXML layout in an omnichannel system is shown in FIG. 1E where interaction manager 160 runs SCXML application 161 which supports visual dialog 162 and voice dialog 163.

User device 168 could communicate via visual dialog 162 through the internet. It could also communicate with media server 163 through CCXM browser 164 and VoiceXML browser 165.

CCXML browser 164 is in direct communication with SCXML application 161 while VoiceXML browser 165 is connected to SCXML application 161 through voice dialog 163.

According to this embodiment, the state of the transaction of the user through user device 168 could go through any of the channels and the state of the transaction is still managed.

In some embodiment, data, especially user data or any other confidential data, first get encrypted when exchanged between any two components of the system. In some embodiments, different levels of encryption are used for different stages of transaction depending on sensitivity and exposure of the stage of processing and communication.

Figure 2:
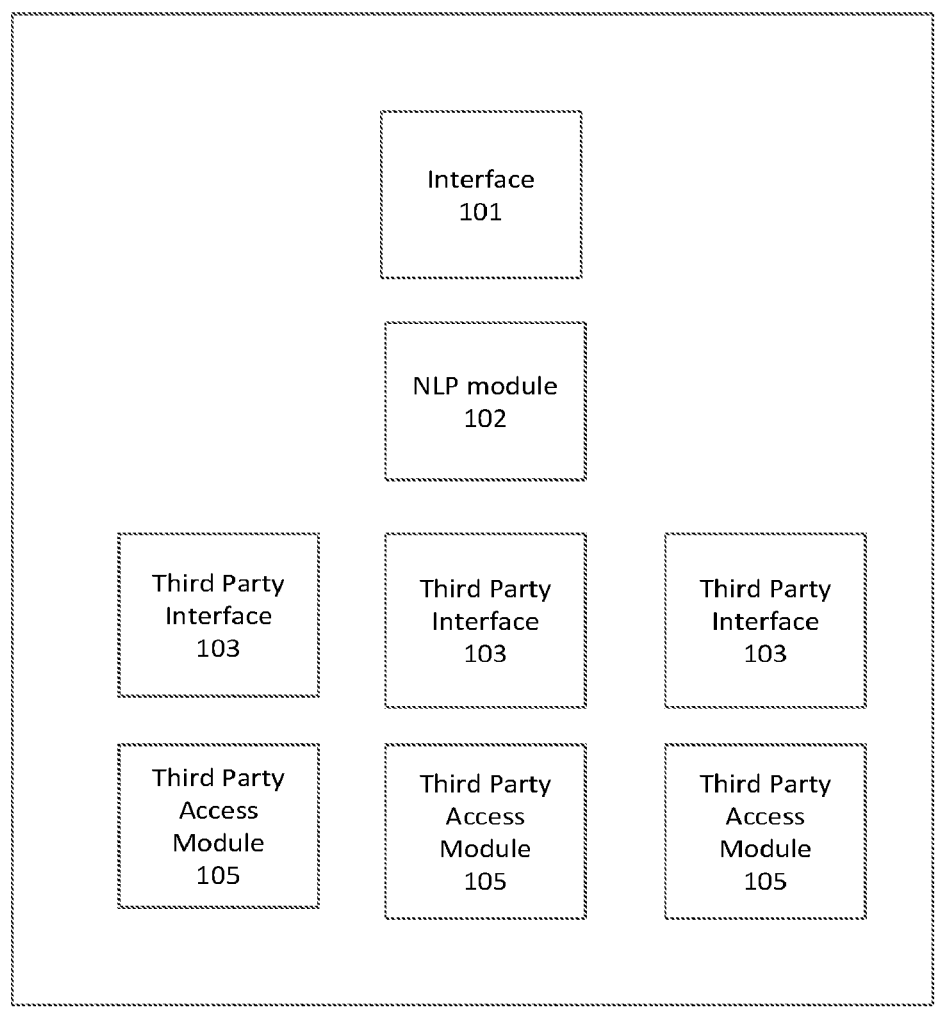
FIG. 2 is a diagram illustrating a chatbot according to one embodiment.

FIG. 2 is a graphical representation of chatbot 100 according to some embodiments. At a high level, chatbot 100 includes interface 101, natural language processor 102, third party interface 103, and third party access module 105. There could be a large number of third party interfaces and third party access modules. Alternatively, the access modules might be integrated upon setting some standards and protocols.

Chatbot 100 engages in a conversation with a user. The conversation could take place using text or voice and could take place on a mobile device or any other connected device like a laptop/computer or tablet.

When chatbot 100 receives a voice request, it uses a speech-to-text module, which could be residing on the system itself or provided by a third party, to generate text query. It may then use natural language processing to parse the text and create a request query to see if it matches or corresponds to any the services it hosts. Alternatively, the chatbot could use XML and VoiceXML to prompt a user to enter or utter her request.

If there is any issue in the chat channel and chatbot 100 cannot address the request or cannot understand it, an exception handler makes a decision accordingly. For instance it may decide that additional questions need to be asked of the user. Ultimately, if there is no other handle to understand the nature of the request, chatbot 100 might decide to relay the request to the voice channel and handle it by reaching a live agent at a specific node of the corresponding automated telephone response system.

Figure 3A:
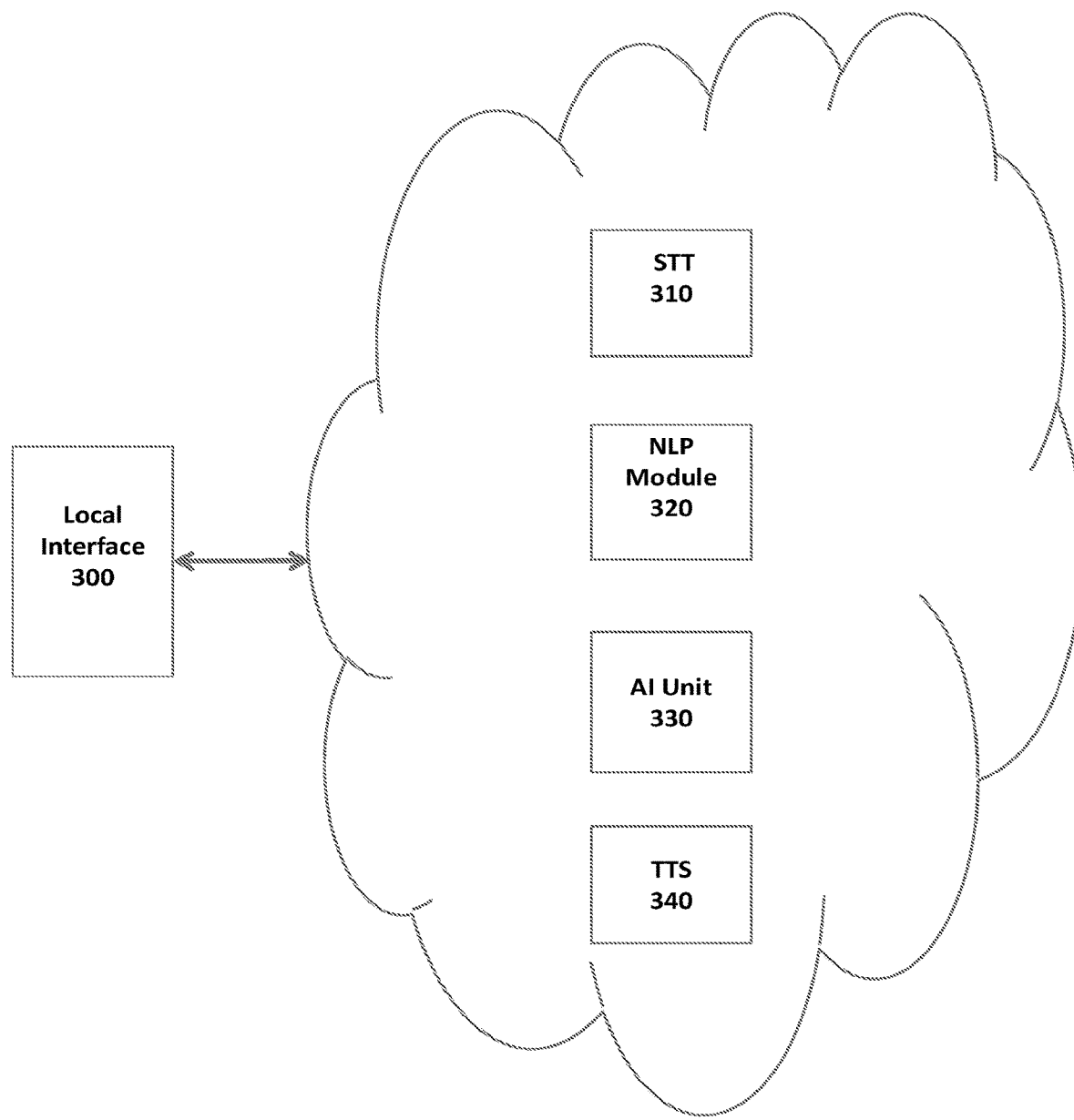
FIG. 3-A is a diagram illustrating the cloud implementation of an omnichannel system according to one embodiment.

FIG. 3A is a graphical representation of how the omnichannel system user interface is configured to receive voice commands according to some embodiments.

Local interface 300, which could be used by the user interface of either chatbot 100 or ICS 130, could receive and then handle a voice command.

As seen in the figure, local interface 300, which for example could be implemented on a mobile device, receives a voice command or query and sends the voice over to cloud module STT 310, a speech-to-text or automatic speech recognition module converting spoken or generated voice to text, which in these embodiments could be a cloud utility offered by a third party. SST 310 returns a text command or query based on the translation of the voice received. Once the command or query is translated to text command or query, it is sent to NLP 320, which could be another third party utility. NLP 200 uses natural language processing to infer or interpret the nature of the query. Once the nature of the query is identified, AI unit 330 could handle the request or direct the right resources to do so. AI unit 330 or part of it, in these embodiments, could be yet another third party utility.

AI unit 330 could create a (partial) response or a request for clarification from the user. In any of these cases, for a voice session, the output of AI unit 330 is used by TTS 340 to generate speech. TTS 340 could be another third party utility and could be integrated with STT 310.

TTS 340 then generates speech or uses recorded voice or speech and sends the speech to local interface 300 where it is uttered to the user by the mobile device.

Figure 3B:
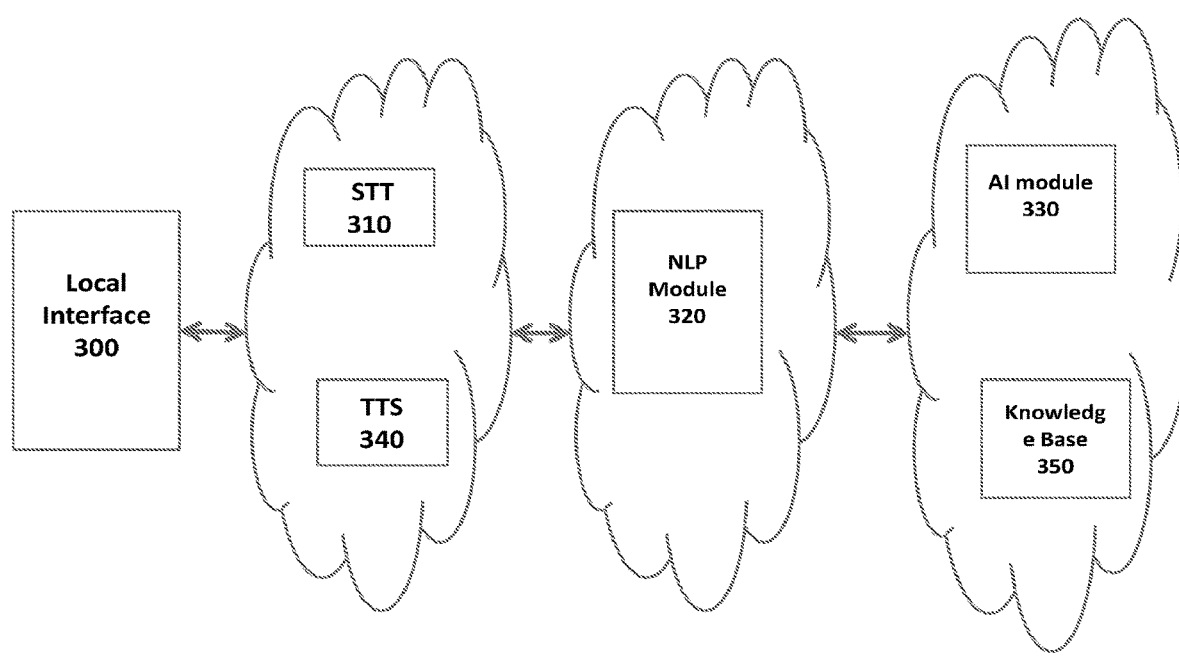

The embodiment of FIG. 3B shows another arrangement where different components of the system are in different cloud platforms with different accessibility speed. The modules STT 310 and TTS 340 are highly accessible cloud components and could be hosted in a cloud platform with high accessibility. Both modules could be third party utilities and integrated with the system.

Further out in FIG. 3B, NLP module 320 is shown on a different cloud platform. NLP module 320 could be a third party utility residing on private or public cloud. The access speed to the NLP module 320 need not be as fast as STT 310 and TTS 340 as it resides on a different platform.

Further out in FIG. 3B, AI 330 and knowledge base 350 are residing on yet another cloud platform and they may be implemented as third party utilities used by or in the system. The cloud platform hosting these units could be a slower access platform for example as these modules are involved in and perform deep learning.

Figure 3C:
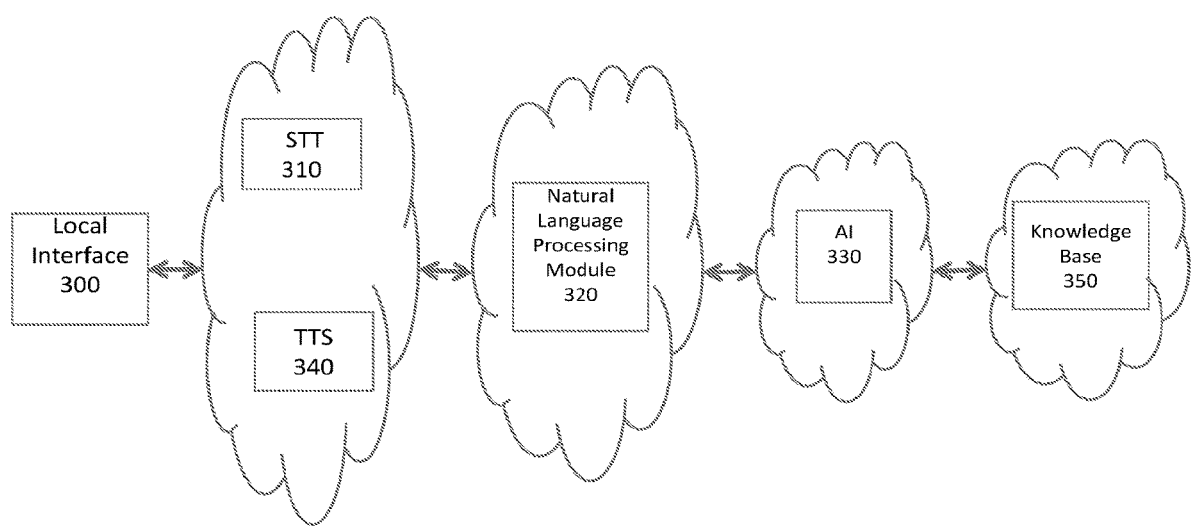

In FIG. 3C, these latter two modules, namely AI 330 and knowledge base 350 are separated into different cloud platforms. Each cloud platform module, further out in the figure, acts as the backend module for the modules closer to the local interface in FIG. 3C.

The user request is processed by NLP module 320 and it is interpreted or translated into query language, understandable by AI 330. This module looks to provide an answer or feedback at a certain stage of a conversation or engagement with a user. AI 330 may use deep learning to train for ever more effective resolution of user requests.

Knowledge base 350 is in communication with AI 330. The accumulated knowledge learned by AI 330 is stored in this database for future or anticipated user request resolution. This is in addition to any initial or periodic knowledge or data about user request resolution already stored in knowledge base 350, for instance by a programmer.

Figure 4:
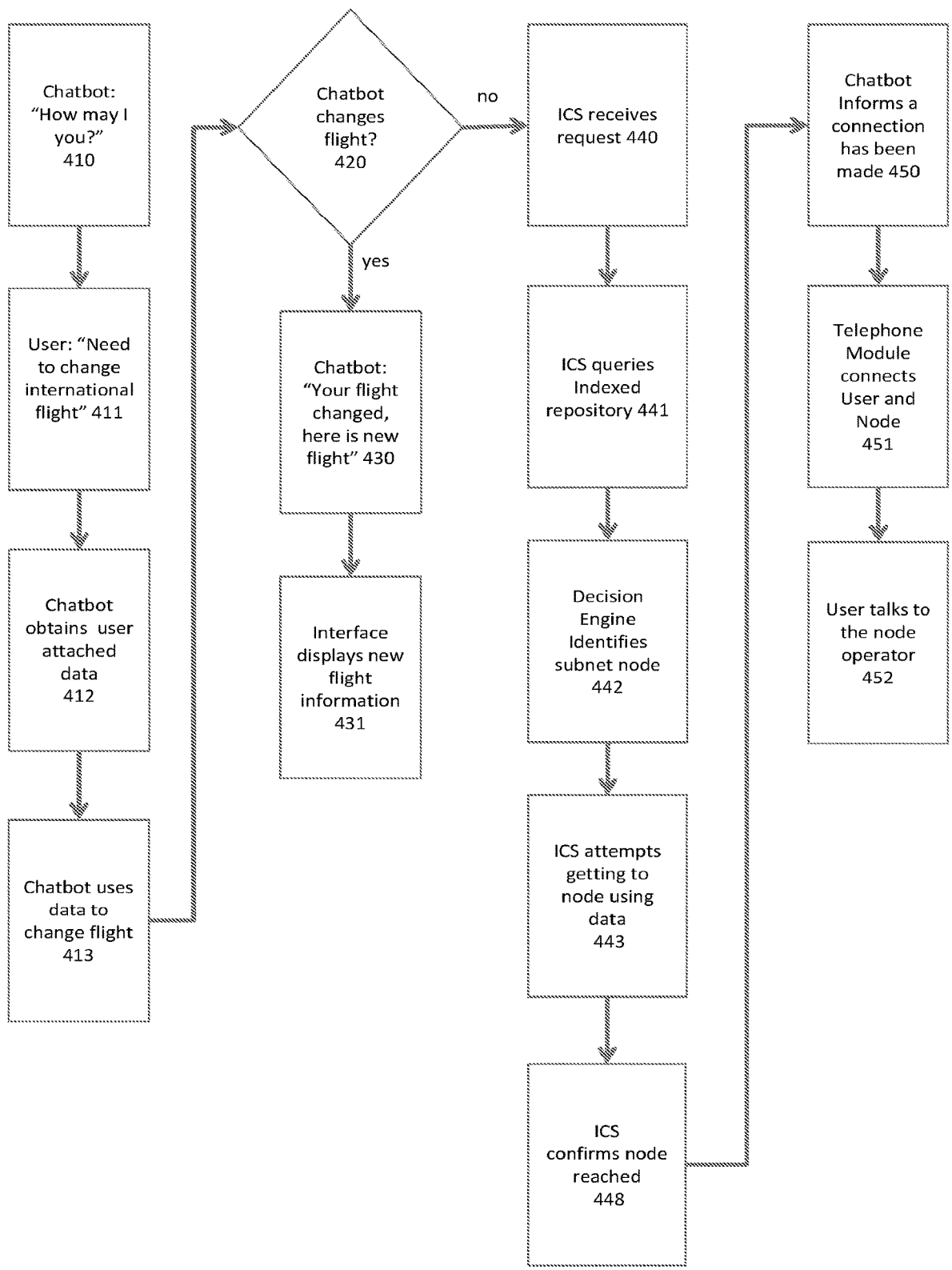
FIG. 4 is a diagram illustrating a user interaction process flow according to one embodiment.

FIG. 4 is a graphical representation of an exemplary transaction between a user and an omnichannel system according to some embodiments. At step 410 the chatbot is engaged in a voice or text conversation with a user upon an inquiry or request or based on anticipation. At step 411 the user expresses their wish to change an international flight.

The chatbot then may use NLP to decipher user's request and uses AI to address the request. Alternatively this interaction could be based on XML or VoiceXML menu presentation and receiving user input and categorizing the request.

At step 412, the chatbot gathers any user data related to this request based on user profile or based on previous interactions or access to applications related to the international flight that reside on the same device on which the chat is taking place. Alternatively, the chatbot uses cloud residing data or transaction records that might relate to this request. If needed, the chatbot could prompt the user for more information.

At step 413 the chatbot uses the request information as well as user data and attempts to access a third-party database to fulfill the request. As a specific example, the chatbot might attempt to access the airline database or other travel authority database to change a flight according to a user request. Once the chatbot manages to perform this task, the confirmation is returned and the chatbot uses text or uses a TTS (text-to-speech) module and generates voice to inform the user through text or voice respectively.

At step 420 the system attempts to confirm whether the user's request has been fulfilled. This may happen after more than one attempt to clarify what the nature of the user's request is and gathering user data at multiple steps and crawling the website or querying/modifying a flight database.

If the request is fulfilled and the user is satisfied, at step 430, the chatbot informs the user that the request has been fulfilled and provides new flight information at step 431 through the interface.

If the request is not fulfilled, at step 440, the ICS system takes over fulfilling the request and obtains all the user data and other data related to the request from the chat channel. This is part of the handover of the request from a web-based system to a telephone based system, or from chat channel to the voice channel.

At this point, or at any other instance deemed reasonable, the system might decide that the user does not need to stay on the line or be engaged in a chat conversation. The user therefore could go about usual business or leisure and is later informed of the state of the request fulfillment as explained below.

At step 441, the ICS queries an indexed repository of automated telephone response system data repository to find out about relevant telephone numbers and their IVR structure as they relate to the best way of fulfilling the user request. Alternatively, and specially if the number is not in the repository, the ICS could attempt to use VoiceXML and CCXML to reach a relevant automated telephone response system or a node in the automated telephone response system.

At step 442, a node in an automated telephone response system is identified as the most relevant node to address the request. The node might be represented by a live agent in an automated telephone response system that is most relevant to the particular request. For instance, in this example, the node might be an agent that handles changing international flights or reservations of an airline.

Once the node is confirmed, at step 443 the ICS attempt to get to the node. In some embodiments this is done using VoiceXML/CCXML navigation of the automated telephone response system.

In some embodiments, the telephone subnet crawler navigates the telephone response system to reach a node in the automated telephone response system relevant to the user request. The telephone subnet crawler utilizes the obtained user data and user information, such as flight confirmation codes and flight information to navigate to the node and to facilitate potential handover to a relevant live agent. In doing so, the telephone subnet crawler may use any combination of DTMF, recorded or generated voice, and software commands. The telephone subnet crawler could use a mapped or previously obtained IVR menu of the automated telephone response system for more efficient navigation.

Once a live agent representing the node is reached or is about to be reached, at step 448, the ICS confirms that the relevant node has been reached. This could take place once the navigation is close to reaching the node, for instance, one step away from the node as it does know the IVR map.

At step 450 the chatbot, or any relevant interface, informs the user that a connection is made or is about to be made. For instance, the chatbot or interface might first pop up a message or text or a notification informing the user that reaching a relevant node operator related the change international flight or reservation at the airline is imminent. The user then could prepare to be ready to talk to an operator.

At step 451 the telephone module places a call to the user (a callback) and connects the user to the agent operator relevant to the identified node. Finally, at step 452, the user could talk to the relevant operator to resolve the request.

Figure 5:
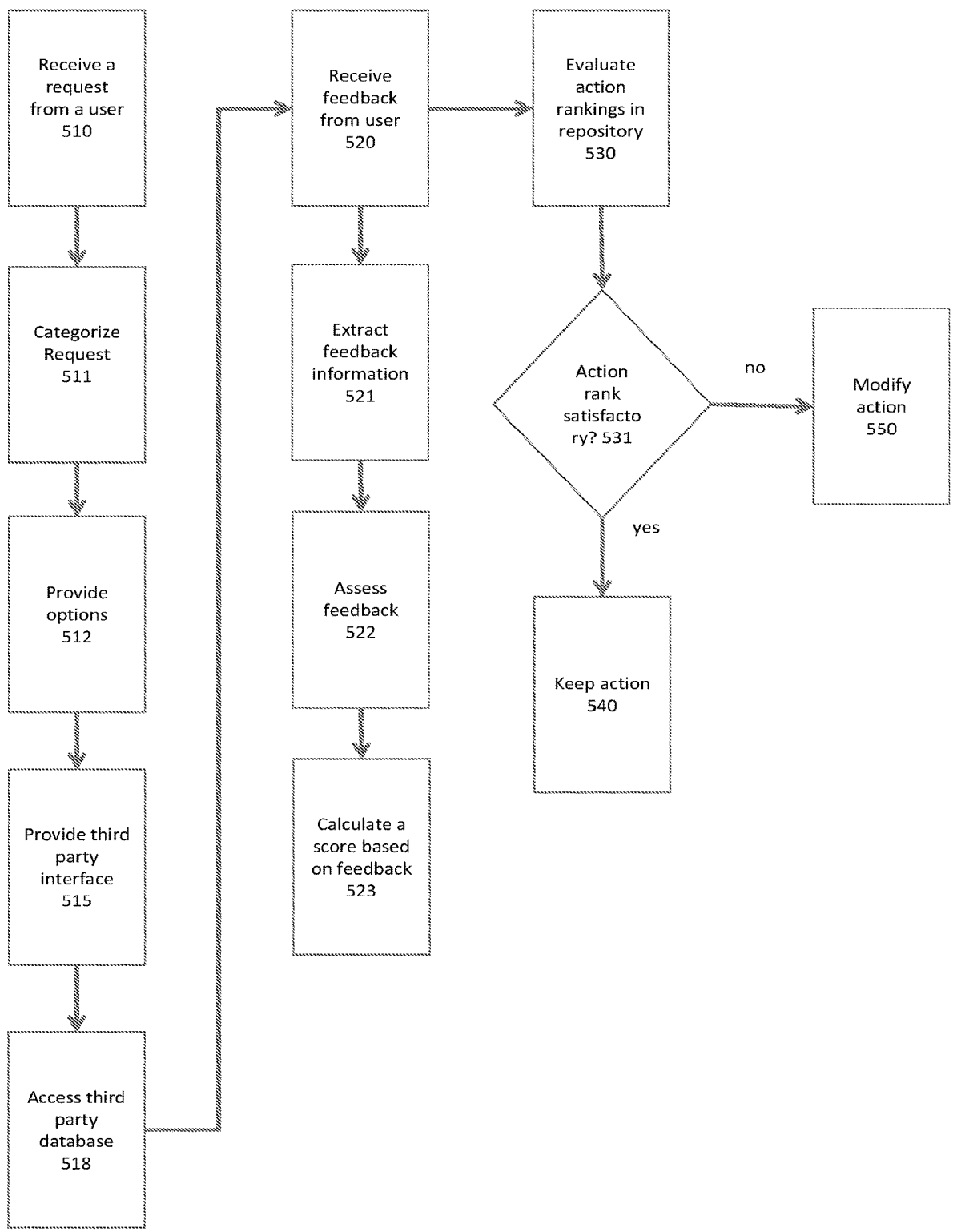
FIG. 5 is a diagram illustrating an omnichannel system process flow according to one embodiment.

Referring now to FIG. 5, this figure is a graphical representation of some of the steps the omnichannel system makes to train itself for better handling of a request according to some embodiments.

At step 510 the omnichannel system receives a request from the user. The request could be in the form of text, voice command or voice call. If the request is with voice command or query or through a voice call, the STT module translates the voice into text.

At step 511 the NLP module uses natural language processing and translates the text into a command or a query language understandable to the system. Alternatively this could be done through menu presentation and selection using XML or VoiceXML.

At step 512 the system provides options to the user. This could be done by either XML or VoiceXML menu presentation or could be done by a learning or (narrow) artificial intelligence AI/NAI module through deep learning.

At step 515, the system provides a third party interface that might be residing on the chatbot system or might be autonomous. The system then interacts with the user and tries to fulfill the user request by accessing a relevant third party database at step 518.

Once a response or a resolution has been reached, the system looks for feedback and analyses and reevaluates its course of action and the best action or channel or interface. This learning process goes on and the omnichannel system gets more and more efficient and faster at handling various requests or situation.

To this end, at step 520 the system receives feedback from the user. The feedback could be anything from a one bit yes or no question to a scoring system or a sentence or two getting the feedback in voice or text and potentially using the NLP module at step 521 to extract feedback information.

The system then assesses the response at step 522, and calculates a score for the response or its course of action at step 523 based on the feedback. This process could be applied to each step in a course of action that the system takes.

Each time a question or request is categorized, a response or course of action is chosen at step 530 based on what the system has learned. To handle further requests, the system then takes a course of action according to what it has learned at step 531. This turns into an iterative learning process.

If, upon feedback and valuation, a course of action turns out to be satisfactory, at step 540 the system opts to keep that response or course of action for that particular category or expand it to similar categories. If the course of action is not satisfactory, at step 550, the system opts to modify the course of action for the future.

Figure 6:
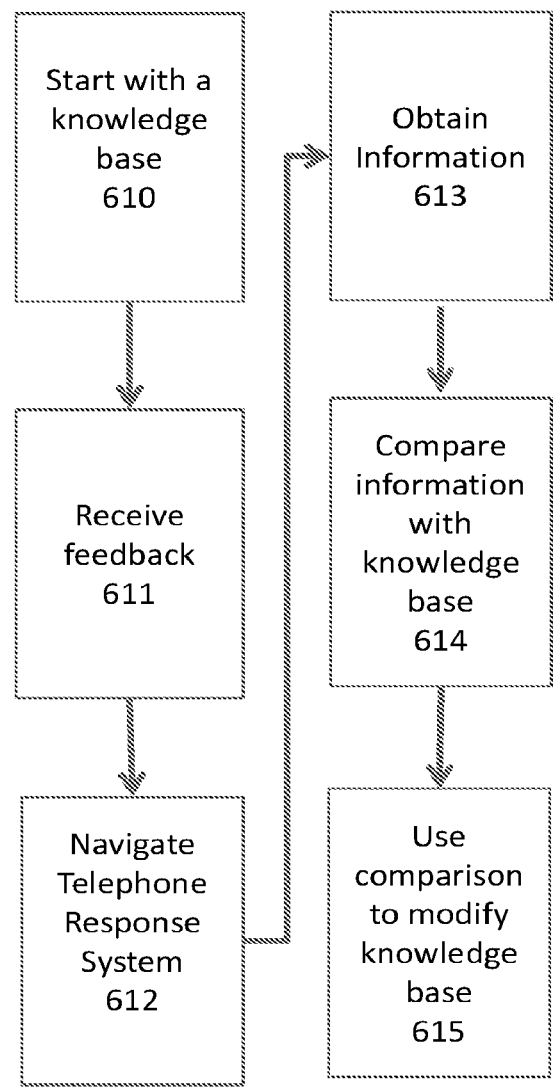
FIG. 6 is a diagram illustrating a knowledge base management system according to one embodiment.

Likewise, as shown in FIG. 6, the voice channel learns from interactions with a user. At step 610, the system starts with a knowledge base. At step 611 the system receives feedback. This could be during the course of a transaction or after a transaction.

At step 612, based on the feedback, the system navigates relevant automated telephone response systems and obtains information from the subnets of various automated response systems, and maps their IVR menu and gathers other information at step 613.

At step 614, the system compares information gathered by the navigation with the knowledge base and modifies the knowledge base accordingly at step 615.

Figure 7:
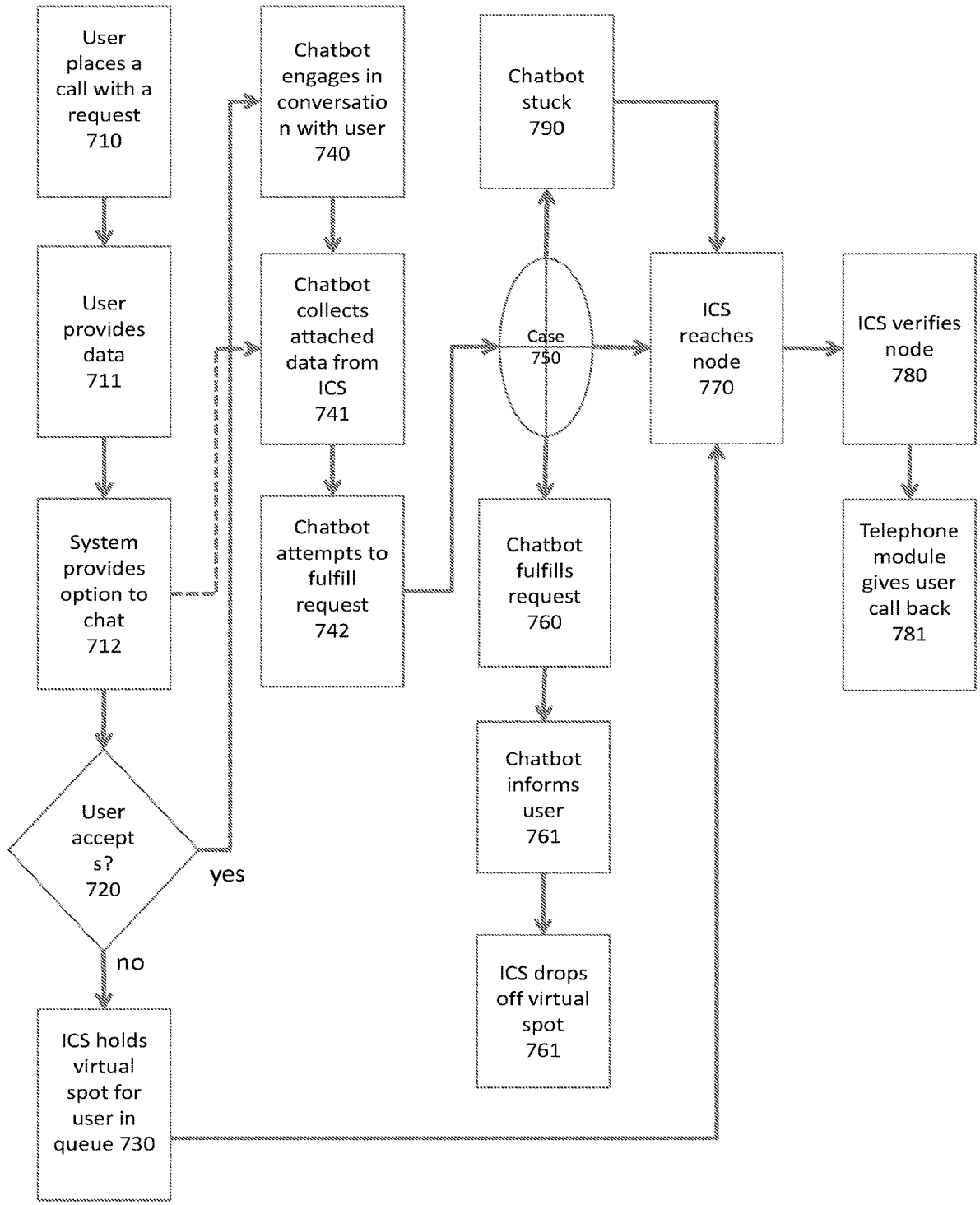
FIG. 7 is a diagram illustrating a process flow of an omnichannel user engagement and response system according to one embodiment.

Referring now to FIG. 7, the figure is a graphical representation of an interaction between a user having a request and an omnichannel system according to some embodiments.

According to these embodiments, at step 710, a user places a voice call with a request to an automated telephone response system. The voice call might be made on a landline telephone, mobile device, or a VoIP phone. The user is then directed to the omnichannel system.

At step 711, the user may provide data. The data could be automatically fetched from user profile or from transaction history. Alternatively, the data could be provided by the user on occasions that new or alternative data is required.

At step 712 the system provides the user the option to use the chat channel instead of, or in addition to, the voice channel and tries to resolve or fulfill the request via the chat channel. At step 720 the user responds yes or no to taking the chat option.

If the user rejects using a chat channel, at step 730, the independent communication system (ICS) holds a virtual spot for the user on a telephone response system that is relevant to the user request. The ICS could be cloud based system and independent of the called party automated telephone response system. For example, if the user is trying to reach an agent in a bank, the ICS holds a spot for the user in the telephone response queue and the user could go about doing usual business until the agent is reached by the ICS. In some embodiments, the ICS uses a telephone subnet crawler to navigate the IVR menu of the automated telephone response system to a specific node of the IVR system. The telephone subnet crawler uses the information from the telephone subnet index and navigates the IVR menu. Alternatively, the ICS may use VoiceXML/CCXML to reach a relevant node.

If this case happens, at step 770, the ICS navigates to a node relevant to the request. This may involve using any of DTMF tones, generated or recorded speech, or software and query commands to navigate the IVR menu of a called party. Alternatively it may involve generating VoiceXML prompts to navigate a menu.

If at step 720, the user accepts to take the chat option, branching to step 740, the chatbot starts engaging in a conversation with the user to fulfill the user request.

At step 741, the chatbot collects session data relevant to fulfilling the transaction. The session data is any data relevant to the user request that has been already collected by the ICS or is otherwise available from the user profile. The omnichannel system therefore does not ask for data from a user more than once and even that happens only when needed. Otherwise the user profile data and transaction history is used to obtain these data by the omnichannel system.

Once the required data is gathered, at step 742, the chatbot attempts to fulfill the request. This might involve, for the example, changing an international flight, getting all the flight confirmation data and user authentication data and accessing airlines database and/or other third party fulfillment websites database.

One advantage of the omnichannel system is the fact that, while the user is engaged by the chat channel which is trying to fulfill the request, the voice channel is still running in parallel as an alternative means for fulfilling the request. Depending on which channel is successful or faster, one of several cases might happen as explained below.

At step 750, one of a few cases might happen. In the first case, at step 760, the web crawler is able to resolve issues and fulfill the request.

The chatbot, accordingly, informs the user of the fulfillment and provides, in this example, new flight information. Once the user is satisfied with the fulfillment of the request, at step 761, the ICS drops the virtual spot in the queue of the automated telephone response system, and the telephone subnet crawler drops its navigation through the IVR menu.

In the second case, at step 790, if the chatbot gets stuck and cannot fulfill the request. In this case, the chat channel stops and instead the ICS, as seen at step 770, continues navigating to the node identified as the most relevant to the request, potentially with a human agent at that node.

It should be noted that, in some embodiments, the ICS is always navigating the automated telephone response system regardless of the stage of the progress in the chat channel. This is in anticipation of the chat channel progress getting stuck, as it is illustrated in step 790. Alternatively the chat channel may be taking a long time addressing the request.

In some embodiments, the user is offered to take the chat channel or uses the chat channel to begin with, however, the chatbot or chat channel gets stuck, and cannot fulfill the request. The system then uses the voice channel and, since the user has spent considerable time on the chat channel, she is moved in front of the queue of the corresponding automated telephone response system. In these embodiments there is no need to run both channels in parallel all the time. However, the voice channel is aware of the time the user has spent on the chant channel through system state control, and grants the user a virtual spot accordingly such that the user doesn't feel she or he has lost all the time on the chat channel. One advantage of these embodiments is that the system does not use voice channel resources unless it needs to do so. In addition, the user doesn't have to wait as long. The live agent benefits from these embodiments by saving time and knowing the nature of the user request and the issues beforehand as well.

In the third case, the ICS navigates to the node and reaches the node while the chat channel is still tying to address the request. In this case, the user is informed that a relevant node has been reached. This might potentially be with a live agent, which in this case, might be the international flights reservation of an airline.

At any of these cases leading to the voice channel resolving the request faster, at step 780, the ICS verifies the node. The ICS then might opt to confirm that indeed a live agent at the node is reached.

According to some embodiments, the ICS verifies that it has indeed reached a live agent or human operator by registering transition audio queues. During navigation, the ICS listens for audio queues, and navigates to a desired node. The audio queues indicating reaching a live agent are called transition audio queues.

The transition audio queues may be recognized by the ICS when the automated telephone response system hands over the call to a live agent of the called party. The live agent could ben distinguished by listing to a distinguished sound or click while navigating the IVR menu.

Alternatively or in addition, the ICS could confirm that an agent has indeed been reached by posing a challenge question. A typical challenge question would be something like: "are you a real person?" and listening for "yes" or alternative positive uttering or "are you a computer?" and listening for "no" or alternative negative uttering. Yet another way to ascertain of the existence of an agent is to prompt the agent for a DTMF tone, for instance, "please press 1 if you are a human agent".

Another way to distinguish transition audio queues is listening for background noise, which could be different for the automated stage and the live agent stage.

Immediately after reaching a node is confirmed, at step 781, the telephone module of the omnichannel system gives the user a call back and connects the user to the live agent.

It should be noted that, in some examples, the desired node might not be a live agent but a place in the IVR menu where the user could directly fulfill his or her request. For instance, a voice recording in the automated telephone response system might confirm that the flight has been changed and provide new information using recorded or generated speech.

According to the present embodiments, a user could pursue fulfilling his or her request on one channel, while keeping his or her spot on another channel. Alternatively, a user could start interacting with the omnichannel system of present embodiments on one channel, and enable other channels to run in parallel in order to provide the fastest route to securing fulfillment of his or her request.

Figure 8:
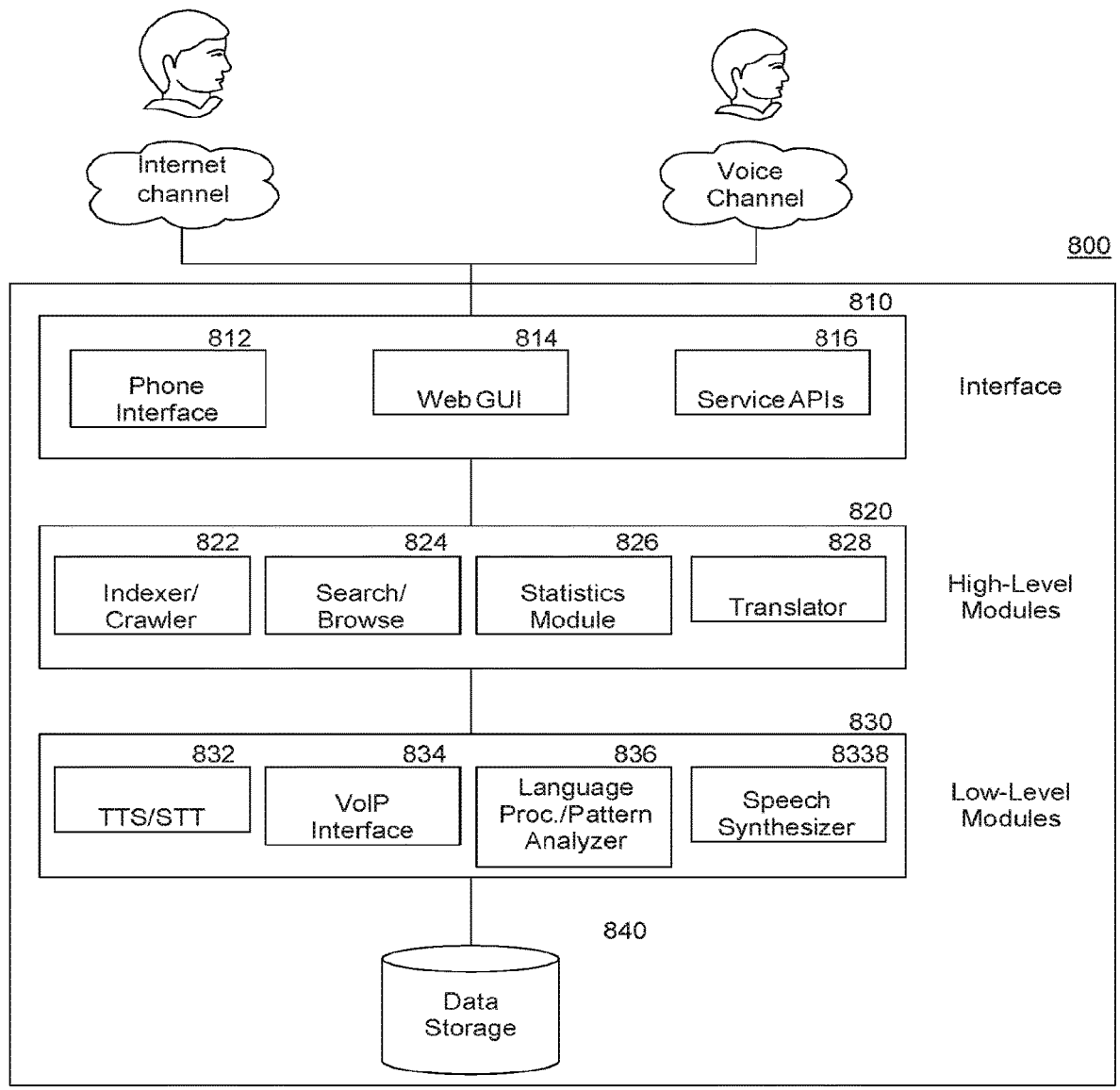
FIG. 8 is a diagram illustrating of an embodiment of the omnichannel system.

Referring now to the embodiment illustrated in FIG. 8, the omnichannel system operates Internet channel and telephone channel through the interface layer 810.

Interface layer 810 includes phone interface 812 with dual-tone-multi-frequency (DTMF) dialing and sound capability, a web graphical user interface (GUI) 814, and service application programming interfaces (APis) 816.

Connected to the interface layer 810 is a set of high-level modules 820 that include telephone subnet crawler/indexer software 822, search/browse module 824, statistics module 826 and translator module 828.

Underlying the high-level modules 820 is a set of low-level modules 830, including text-to-speech/speech-to-text (TTS/STT) module 832, voice-over-internet APis 834, natural language processing/pattern analyzer 836, and speech synthesizer 838. Finally, omnichannel system 800 has data storage 840.

There are variations and modifications that will be readily apparent to those skilled in the art in light of the above teachings. It is therefore to be understood that, within the scope of the claims hereto attached and supported by this specification, the embodiments may be practiced other than as specifically described.

What is claimed is:

1. A computer-implemented method, comprising:
    initiating a session with a user, through a user device, and a chatbot operating on a web-based system;
    receiving a request from the user through the user device at the chatbot;
    retrieving data related to the request through the web-based system;
    attempting to fulfill the request through the web-based system; and
    transferring the request and the data from the session from the web-based system to a telephone based system if the request was not fulfilled by the web-based system so as to carry over session data from the web-based system to the telephone based system.

2. The computer-implemented method as set forth in claim 1, wherein attempting to fulfill the request through the web-based system comprises:
    using natural language processing to decipher the request; and
    using artificial intelligence in an attempt to fulfill the request.

3. The computer-implemented method as set forth in claim 1, wherein retrieving data related to the request through the web-based system comprises receiving the data from the user device.

4. The computer-implemented method as set forth in claim 1, wherein retrieving data related to the request through the web-based system comprises using cloud residing data as the data related to the request.

5. The computer-implemented method as set forth in claim 1, wherein attempting to fulfill the request through the web-based system comprises accessing a third-party database to fulfill the request.

6. The computer-implemented method as set forth in claim 1, further comprising querying, at the telephone based system, an indexed repository of an automated telephone response system to identify at least one telephone node relevant to fulfillment of the request.

7. The computer-implemented method as set forth in claim 6, wherein the telephone node relevant to fulfillment of the request comprises a telephone node represented by a live agent in the automated telephone response system.

8. The computer-implemented method as set forth in claim 1, further comprising navigating, using a telephone subnet crawler, the telephone response system using the data to reach a node in the automated telephone response system relevant to the user request.

9. The computer-implemented method as set forth in claim 8, wherein navigating the telephone response system comprises navigating, using the telephone subnet crawler, the telephone response system by using any combination of DTMF, recorded or generated voice, software commands, or a mapped IVR menu of the automated telephone response system.

10. The computer-implemented method as set forth in claim 8, further comprising:
    verifying that a node in the automated telephone response system relevant to the user request has been reached;
    transmitting a message through the web-based system to the user device notifying the user that connection to a node operator, related to the request, is imminent; and thereby, a connection from the telephone based system to the user connects the user to the node in the automated telephone response system relevant to the user request.

11. A system comprising:
a web-based system comprising a chatbot, operating on the web-based system, to initiate a session with a user, through a user device, and to receive a request from the user through the user device at the chatbot, to retrieve data related to the request through the web-based system, and to attempt to fulfill the request through the web-based system; and
a telephone based system to receive the request and the data from the session from the web-based system if the request was not fulfilled by the web-based system so as to carry over session data from the web-based system to the telephone based system.

12. The system as set forth in claim 11, wherein the web-based system further comprises:
a natural language processing module to decipher the request; and
an AI module to use artificial intelligence in an attempt to fulfill the request.

13. The system as set forth in claim 11, wherein the web-based system further to receive the data from the user device.

14. The system as set forth in claim 11, wherein the web-based system further to use cloud residing data as the data related to the request.

15. The system as set forth in claim 11, wherein the web-based system further to access a third-party database to fulfill the request.

16. The system as set forth in claim 11, further comprising an automated telephone response system comprising an indexed repository, and wherein the telephone based system further to query the indexed repository to identify at least one telephone node relevant to fulfillment of the request.

17. The system as set forth in claim 16, wherein the telephone node relevant to fulfillment of the request comprises a telephone node represented by a live agent in the automated telephone response system.

18. The system as set forth in claim 11, further comprising a telephone subnet crawler to navigate the telephone response system using the data to reach a node in the automated telephone response system relevant to the user request.

19. The system as set forth in claim 18, wherein the telephone subnet crawler further to navigate the telephone response system by using any combination of DTMF, recorded or generated voice, software commands, or a mapped IVR menu of the automated telephone response system.

20. The system as set forth in claim 18, wherein the web-based system further to verify that a node in the automated telephone response system relevant to the user request has been reached, transmit a message through the web-based system to the user device notifying the user that connection to a node operator, related to the request, is imminent, thereby, a connection from the telephone based system to the user connects the user to the node in the automated telephone response system relevant to the user request.

* * * * *